(12) United States Patent
Anderson et al.

(10) Patent No.: US 6,502,970 B1
(45) Date of Patent: Jan. 7, 2003

(54) VEHICULAR PUDDLE LIGHT

(75) Inventors: James Burr Anderson, Cookeville, TN (US); George Robert Hulse, Cookeville, TN (US)

(73) Assignee: Federal-Mogus World Wide, Inc., Southfield, MI (US)

(*) Notice: Subject to any disclaimer, the term of this patent is extended or adjusted under 35 U.S.C. 154(b) by 0 days.

(21) Appl. No.: 09/342,974

(22) Filed: Jun. 30, 1999

(51) Int. Cl.$^7$ ................................................. B60Q 1/26
(52) U.S. Cl. ........................ 362/494; 362/558; 362/511; 362/560; 362/492
(58) Field of Search ........................ 362/494, 511, 362/558, 582, 492, 560, 140

(56) References Cited

U.S. PATENT DOCUMENTS

| | | | |
|---|---|---|---|
| 4,274,078 A | 6/1981 | Isobe et al. | 340/98 |
| 5,371,659 A | 12/1994 | Pastrick et al. | |
| 5,497,305 A | 3/1996 | Pastrick et al. | |
| 5,497,306 A | 3/1996 | Pastrick | |
| 5,548,492 A | 8/1996 | Hansen et al. | 362/83.1 |
| 5,624,176 A | 4/1997 | O'Farrell et al. | |
| 5,669,699 A | 9/1997 | Pastrick et al. | |
| 5,669,704 A * | 9/1997 | Pastrick | 362/83.1 |
| 5,669,705 A | 9/1997 | Pastrick et al. | |
| 5,788,357 A | 8/1998 | Muth et al. | 362/83.1 |
| 5,823,654 A | 10/1998 | Pastrick et al. | 363/83.1 |
| 5,863,116 A | 1/1999 | Pastrick et al. | 363/494 |
| 5,871,275 A | 2/1999 | O'Farrell et al. | 362/494 |
| 5,879,074 A | 3/1999 | Pastrick | 362/494 |
| 5,938,320 A * | 8/1999 | Crandall | 362/494 |
| 5,984,497 A | 11/1999 | Foerstner et al. | 362/511 |
| 6,074,077 A | 6/2000 | Pastrick et al. | 362/494 |
| 6,086,229 A | 7/2000 | Pastrick | 362/494 |
| 6,099,154 A | 8/2000 | Olney | 362/494 |
| 6,099,155 A | 8/2000 | Pastrick et al. | 362/494 |
| 6,149,287 A | 11/2000 | Pastrick et al. | 362/494 |
| 6,176,602 B1 | 1/2001 | Pastrick et al. | 362/494 |
| 6,276,821 B1 * | 8/2001 | Pastrick et al. | 362/494 |

* cited by examiner

Primary Examiner—Sandra O'Shea
Assistant Examiner—Anabel Ton
(74) Attorney, Agent, or Firm—Reising, Ethington, Barnes, Kisselle, Learman & McCulloch, P.C.

(57) ABSTRACT

A mirror assembly for a vehicle with a light is provided. The mirror assembly includes an exterior mirror assembly that is attached to the vehicle. A light source is removably positioned inside the exterior mirror assembly. A waveguide is positioned to transmit light from the light source to a location outside the exterior mirror assembly. The light source is secured to a light holder which is positioned inside and attached to the exterior mirror assembly. The light holder is configured to efficiently couple light from the light source to the waveguide.

24 Claims, 3 Drawing Sheets

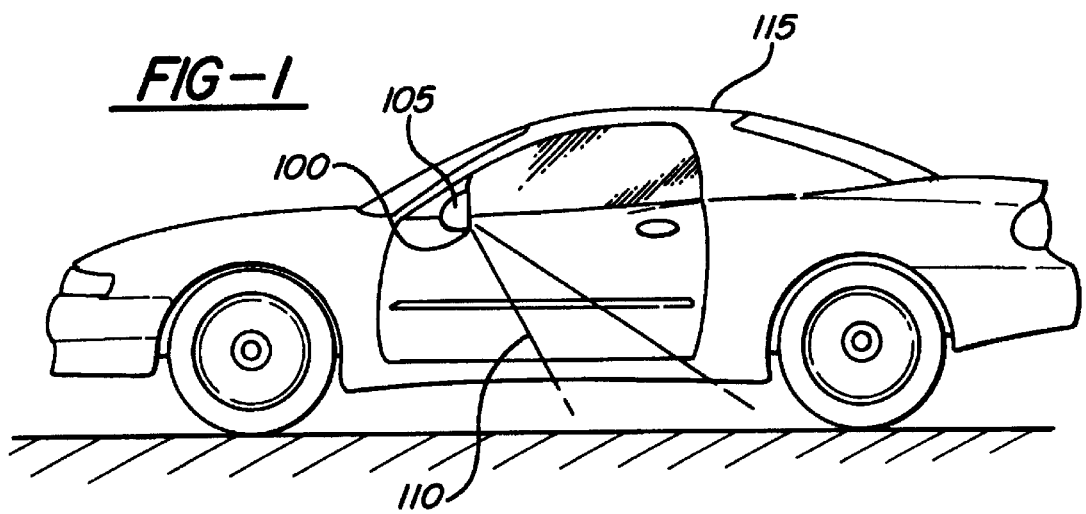
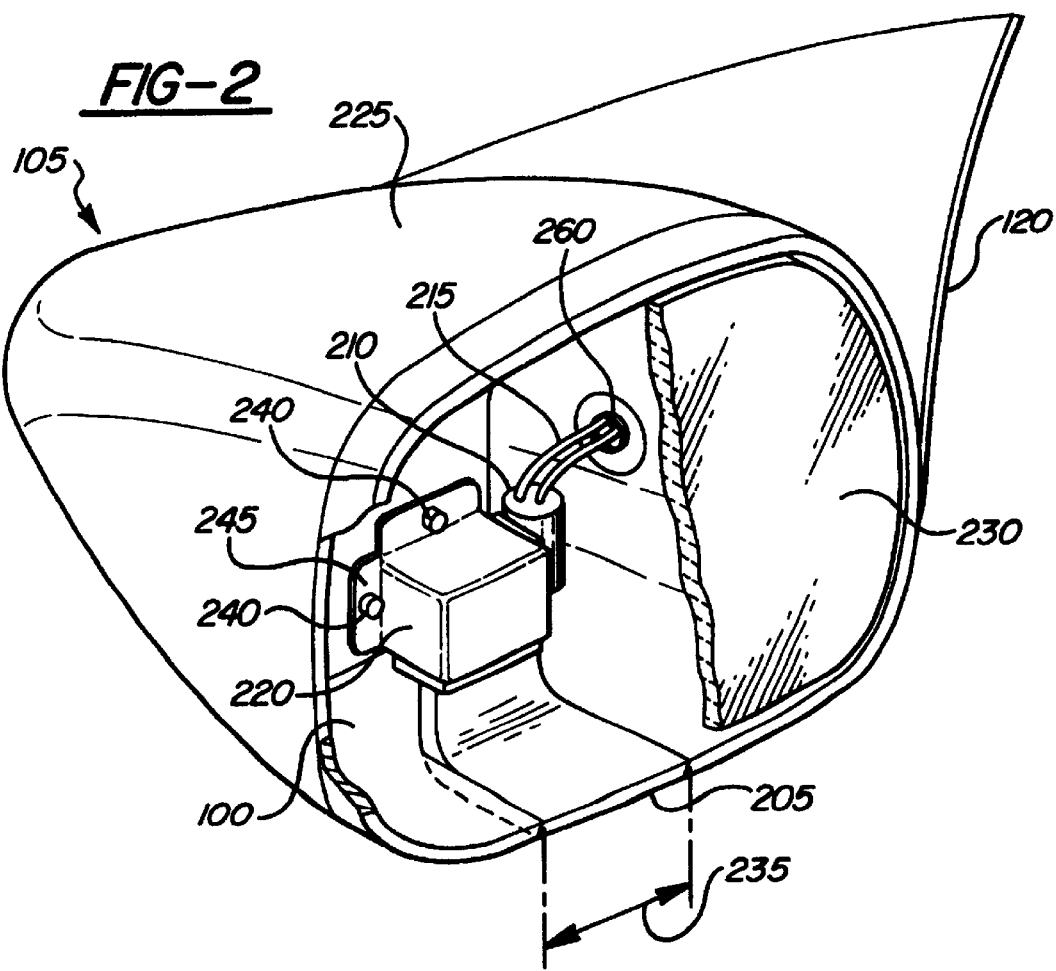

VEHICULAR PUDDLE LIGHT

TECHNICAL FIELD

This invention relates to a light that fits into a vehicle exterior mirror assembly.

BACKGROUND

It is known to incorporate lights into vehicle exterior mirrors. Such lights have been used as puddle lights, backing lights, and auxiliary turn signals.

SUMMARY

The invention provides a mirror assembly with a light for a vehicle. To this end, an exterior mirror assembly is attached to the vehicle and a light source is removably positioned inside the exterior mirror assembly. A waveguide is positioned to transmit light from the light source to a location outside the exterior mirror assembly.

Embodiments may include one or more of the following features. A light holder, positioned inside and attached to the exterior mirror assembly, may be used to secure the light source in the exterior mirror assembly. A reflector attached to the light holder may be configured to efficiently couple light from the light source to the waveguide.

The waveguide may be configured to focus light at the location. Alternately, the waveguide may be configured to diffuse light at the location.

A core of the waveguide may be formed of plastic. A cladding of the waveguide may be air surrounding the waveguide. Alternately, a cladding of the waveguide may be formed by coating the waveguide with a material that has a lower refractive index than a refractive index of the plastic. The coating may be used to secure the waveguide to the exterior mirror assembly. The waveguide may be formed as a part of the exterior mirror assembly.

The exterior mirror assembly may include a slot that receives the light source and waveguide. The waveguide may be attached to the exterior mirror assembly.

The waveguide may include an outer reflective layer positioned at an end of the waveguide and configured to reflect stray light from the light source. The transmitted light from the waveguide may be polarized, and may be of a color chosen to depend on a usage for the light source.

The waveguide may have a rectangular or cylindrical cross sectional area perpendicular to a direction of the light.

The waveguide may include an outer surface that transmits light at a direction dependent on a normal angle to the outer surface.

The waveguide may include a plurality of fiber optic waveguides.

Other features and advantages will be apparent from the following description, including the drawings, and from the claims.

DESCRIPTION OF DRAWINGS

FIG. 1 is a side view of a vehicle illustrating use of a puddle light in an exterior mirror assembly.

FIG. 2 is a breakaway perspective view of the exterior mirror assembly.

DESCRIPTION

Referring to FIG. 1, a puddle light 100 that fits into an external rear-view mirror assembly 105 provides an additional exterior source of light 110 for a vehicle 115. The puddle light provides a source of light near the vehicle for use by the vehicle operator when entering or exiting the vehicle. The puddle light also may provide an extra turn signal or tail light similar to a traditional rear turn signal and center rear stopping light with the added benefit that, while seated in the vehicle, the driver may view the extra turn signal light to see if it is on.

Figure 3:
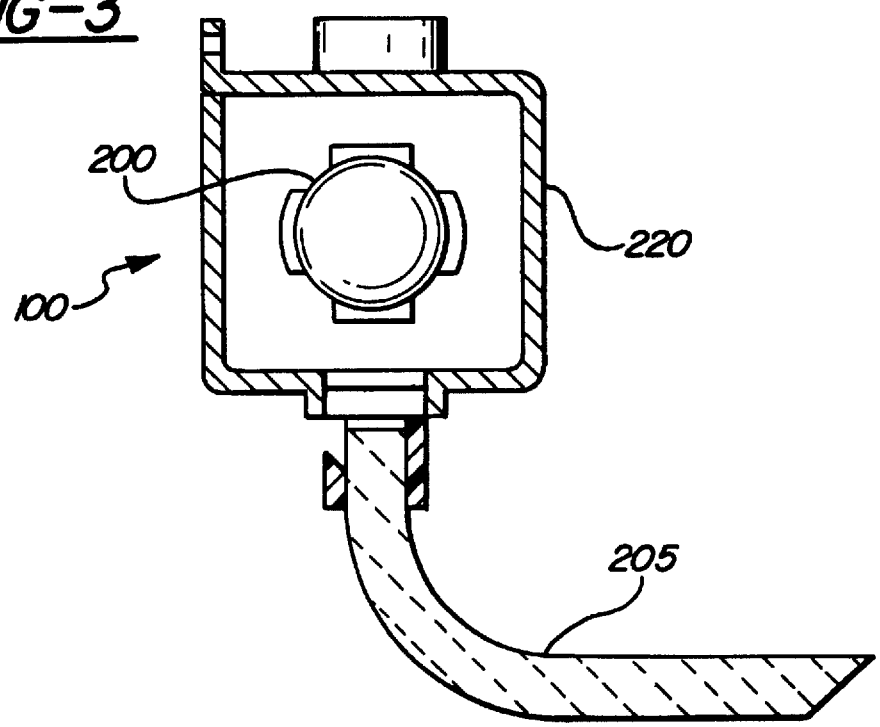
FIG. 3 is a cross-sectional side view of the puddle light.
Figure 4:
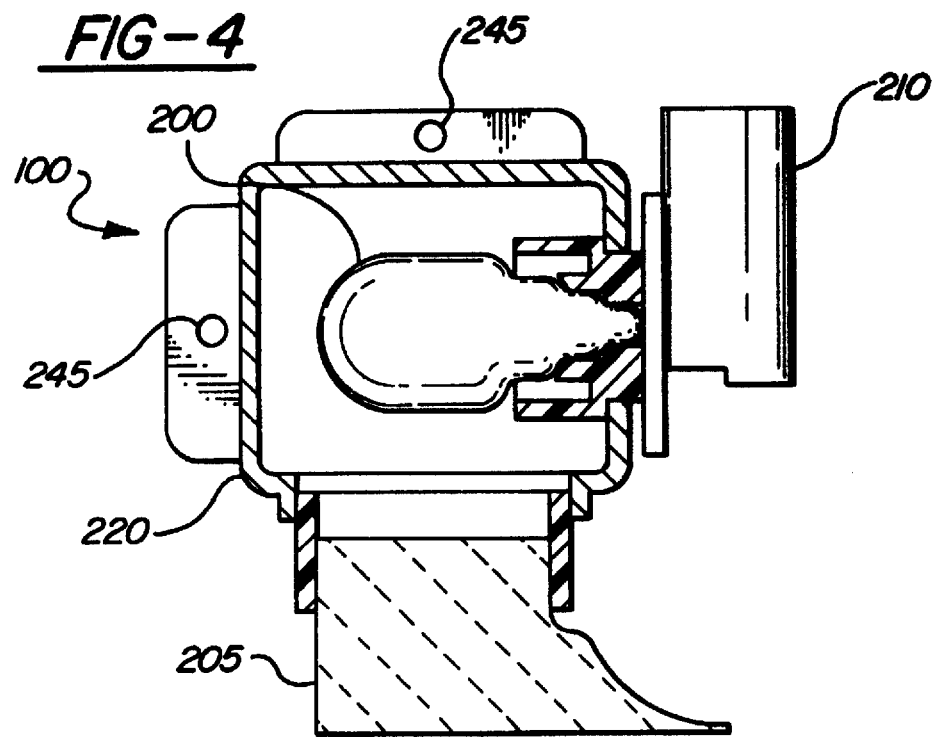
FIG. 4 is a cross-sectional front view of the puddle light.

FIG. 2 shows a perspective view of the external rear-view mirror assembly 105. Shown in FIGS. 3 and 4 are cross-section side and front views of the puddle light 100 removed from the assembly 105. An arm 120 connects the assembly 105 to the vehicle 115. The puddle light 100 includes a bulb 200, a waveguide 205, a bulb socket 210, electrical wires 215, and a bulb holder 220. The assembly 105 includes a housing 225, which holds the puddle light 100, and a mirror 230. Light emanating from the bulb 200 is transmitted through the waveguide 205 to a location outside of the housing.

The mirror 230 is connected to the housing 225 with mounts (not shown) typically used in a side-view mirror assembly. Furthermore, the mirror 230 and housing 225 may be formed of appropriate rigid material such as glass or acrylic that may be coated for reflectivity. The housing 225 includes a slot 235 at a lower end which receives the puddle light 100. An interior volume of the housing 225 must accommodate the puddle light 100, movement of the mirror 230, and any mechanical or electrical components used for adjustment of the mirror 230.

To connect the bulb holder 220 to the housing 225, screws 240 are mounted through a set of holes 245 on the bulb holder 220 and are fastened to the housing 225. The bulb 200 is secured in the bulb holder 220 with the socket 210 to allow for easy removal of the bulb 200. Wires 215 from the bulb 200 connect, through a sleeve 260 in the arm 120, to an actuator circuit and power source inside the vehicle 115. Power to the bulb 200 may be actuated remotely, using a transmitter carried by the vehicle operator and a receiver positioned on the vehicle, or locally from within the vehicle. The bulb holder 220 may be formed of any rigid material and it may be made reflective or lens-shaped to focus light from the bulb 200 onto the waveguide 205.

The waveguide 205 may be glued to the housing 225 or removably fastened to the housing 225. Thus, rigid connectors or snaps may be formed in the waveguide to connect with aligned clips in the wall of the housing. Alternately, the waveguide 205 may be fastened to the housing 225 using an ultrasonic welding process.

The waveguide 205, which is typically made of plastic or glass, provides light transmission without additional use of lenses, mirrors, or prisms. If the waveguide if formed from plastic or similar material, it can be manufactured using an injection molding process, either separately, or as part of a two step process in which it is molded as part of the housing. Injection-molded waveguides are rigid, do not require maintenance, and have low manufacturing costs. The waveguide 205 is secured to a surface of the housing 225 such that one end of the waveguide receives light from the bulb 200 and another end emits light from a front of the assembly 100.

The waveguide is rectangular and may be thought of as including an inner medium (or core 265) embedded in an outer medium (or cladding 270), where the waveguide's cladding is the surrounding air. To provide efficient light transmission, a refractive index, $n_1$, of the core 265 must be greater than a refractive index, $n_2$, of the cladding 270. For example, the refractive index for air is 1.0 and the refractive index for plastic is around 1.5. At boundaries, light refracts according to Snell's Law. Thus, light rays entering an input face 275 of the core 265 at angles (θ) smaller than a critical angle ($θ_c$), measured with respect to a surface of the input face 275, undergo multiple total internal reflections at a core/cladding boundary 280. Light rays making angles greater than the critical angle refract through the core/cladding boundary 280 at each reflection. For example, if the waveguide were made from plastic and surrounded by air, the critical angle, $θ_c$, would be:

$$\theta_c = \arcsin\left(\frac{n_a}{n_b}\right) = \arcsin\left(\frac{1}{1.5}\right) = 41.8$$

where $n_a$ is the index of refraction of air (1.0) and $n_b$ is the index of refraction of plastic (1.5). Because of the multiple reflections/refractions, light transmission efficiency depends on a length of the waveguide 205; i.e. the longer the waveguide, the lower the efficiency.

Figure 5:
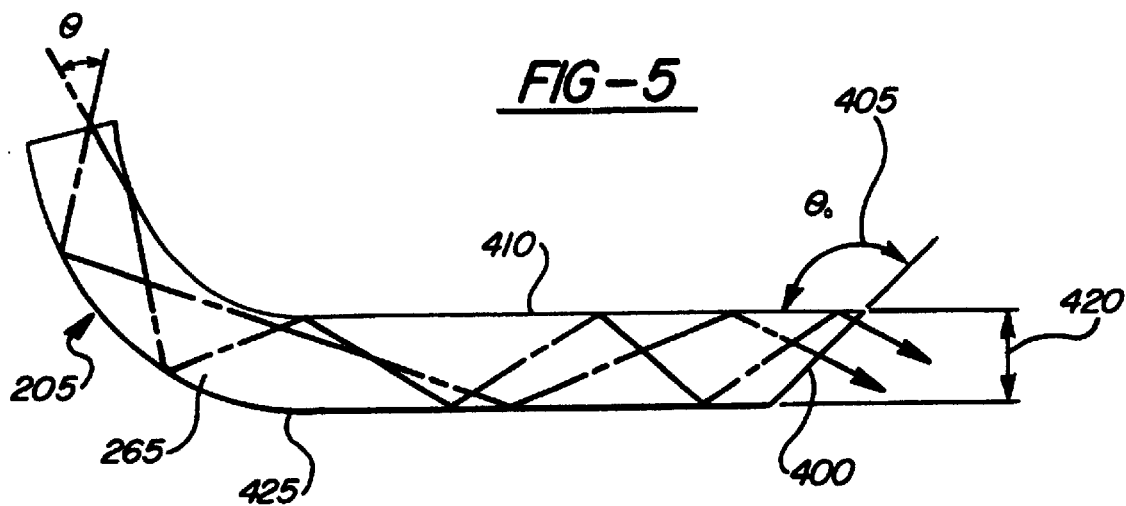
FIG. 5 is a cross-sectional side view of a waveguide used in the puddle light.

FIG. 5 shows a side-view center cross section of waveguide 205 of FIGS. 2–4. Light rays from the bulb 200 (displayed as lines with arrows) are guided into the waveguide using the bulb holder 220. The bulb holder 220, bulb 200, and waveguide 205 are arranged to efficiently couple light from the bulb 200 to the waveguide 205. Light from the bulb 200 is emitted from the waveguide 205 at an output surface 400 that makes an angle 405, $θ_o$, with an axis parallel to a planar surface 410 of the waveguide 205. The angle 405 may be adjusted to direct light to a certain location.

Figure 6:
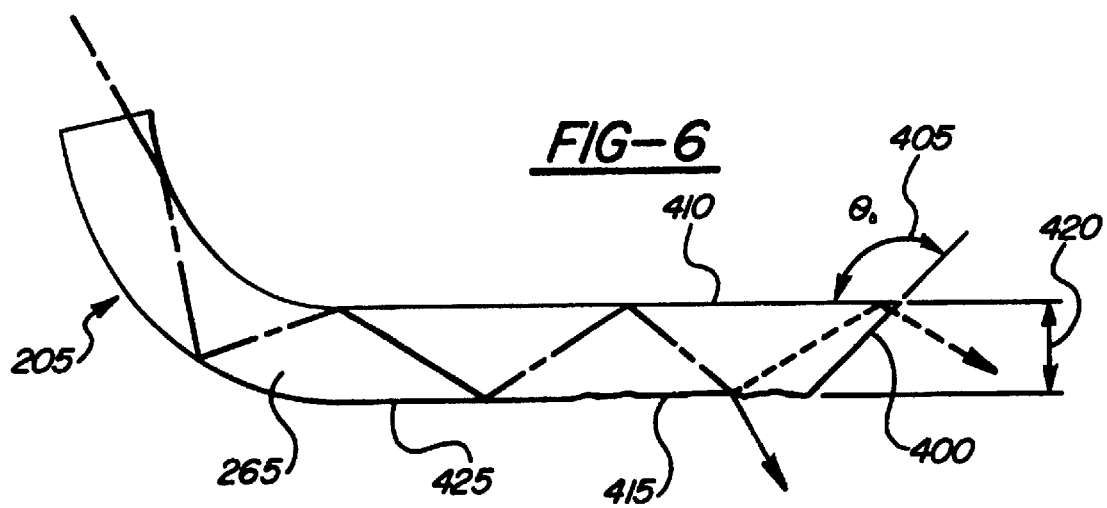
FIG. 6 is a cross-sectional side view of the waveguide of FIG. 5 that uses a roughened surface to diffuse light.

Referring also to FIG. 6, some light may refract from the waveguide 205 at a roughened external surface 415. The roughness diffuses the light since a light ray striking the roughened surface refracts and reflects at angles which depend on where the light ray strikes the surface. This configuration serves to spread out the light and direct it downward. Additionally, if a depth 420 of the core is narrowed, more light leaks out through an external surface 425 since light rays in a narrower core reflect more often, and thus have a greater chance of refraction at the core/cladding boundary.

One advantage of this puddle light and assembly is its low cost. The waveguide reduces the number of optical components, e.g. mirrors, prisms, or lenses, which may traditionally be used in a puddle light assembly. Another advantage is ease of repair. The assembly 105 provides easy access to both the puddle light 100 and the bulb 200.

Figure 7:
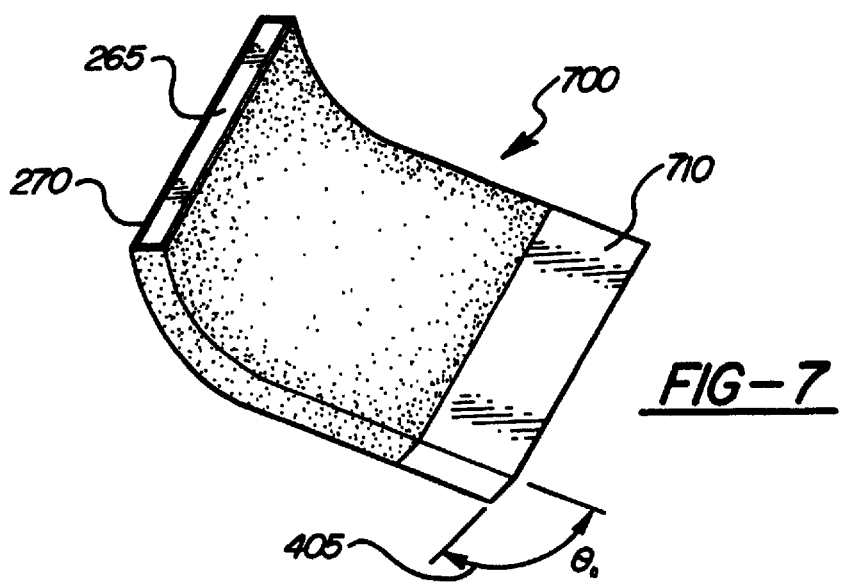
FIG. 7 is a perspective view of the waveguide.

Referring to FIG. 7, in an alternate embodiment 700, the waveguide may be coated with epoxy 705 which has a lower index of refraction than plastic or glass in the core 265. Thus, most of the light rays entering the waveguide core are internally reflected at the plastic/epoxy boundary 280. Additionally, a portion of light rays are reflected at the outer epoxy/air boundary. The epoxy coating may be used also to secure the waveguide to the housing. The epoxy-coated waveguide offers several advantages over the uncoated waveguide. For example, contaminants on the surface of an un-coated waveguide can cause light at the waveguide/air boundary to be scattered and refracted instead of being internally reflected, which increases loss in the un-coated waveguide. The epoxy layer increases the distance between the contaminants and the waveguide core, which reduces the amount of light that reaches the waveguide/air boundary of the coated waveguide. In addition, plastic coatings can be applied to the outer surface of the epoxy layer, and clamps or other fixtures can be attached to the outer surface with reduced effect on light transmission through the waveguide.

To increase light transmission efficiency, light entering the waveguide 205 at an angle greater than the critical angle may be captured inside the core using a reflective coating or tape 710 positioned at an end of the waveguide. The tape 710, covering an outer surface of the waveguide 205, reflects light rays that refract at the core/cladding boundary 280.

The waveguide may be made of any materials which exhibit the core and cladding properties described above. For example, the core of the waveguide may be formed of polycarbonate (which has an index of refraction of 1.58) and the cladding may be a coating of epoxy (which has an index of refraction of 1.4). Alternatively, the core of the waveguide may be glass and the cladding may be a coating with a lower index of refraction than that of glass.

In another embodiment, the waveguide may be planar or a cylindrical fiber. Different shapes would change the transmission characteristics of the waveguide. For example, fiber waveguides can provide greater flexibility than molded plastic waveguides. Since light refraction, absorption, and reflection from a surface boundary depends also on a state of polarization of the light, transmission of the waveguide will change depending on the polarization state of the light from the bulb 200. Therefore, state of polarization of the light may be changed depending on the application of the puddle light.

In still another embodiment, the waveguide and bulb may be configured to transmit light in a band of frequencies. For example, core and cladding materials may be chosen to transmit only light in a range of frequencies or the bulb may emit light in a narrow band of frequencies. Thus, different colors of light may be emitted depending on the use of the puddle light. If the puddle light is used as an extra turn signal, it is preferable that the transmitted light is a red color. If the puddle light is used as an illuminator for safety reasons, then bright white light is preferable. In this application, the bulb may emit white light and the waveguide may transmit a maximum percentage of the light emitted from the bulb.

In a further embodiment, light transmission efficiency, which depends on modal properties of the waveguide, may be altered by changing the modal properties. To change modal properties, the depth of the core may be changed relative to the depth of the cladding or the refractive index may be configured to vary with a distance from a center of the core.

Other embodiments are within the scope of the following claims.

What is claimed is:

1. A mirror assembly for a vehicle comprising:
   a mirror housing having an opening located at a lower portion of the housing;
   a mirror secured to the mirror housing;
   a light source mounted within the mirror housing; and
   a waveguide mounted within the mirror housing and extending through the housing from an input end to an output end, wherein the input end is oriented proximate the light source to receive light emanating from the light source and the output end is located within the opening in the mirror housing such that the output end forms both a lower, exterior surface portion of the mirror housing and a front, exterior surface portion of the mirror housing, and wherein light entering the input end of the waveguide from the light source is conducted by internal reflection within the waveguide and exits the mirror housing through the output end of the waveguide.

2. The mirror assembly of claim 1, further comprising a light holder, positioned inside and attached to the mirror assembly, wherein the light source is secured to the light holder.

3. The mirror assembly of claim 2, wherein the light holder is configured to efficiently couple light from the light source to the waveguide.

4. The mirror assembly of claim 1, wherein the waveguide is configured to focus light at a location outside the mirror housing.

5. The mirror assembly of claim 1, wherein the waveguide is configured to diffuse light at a location outside the mirror housing.

6. The mirror assembly of claim 1, wherein a core of the waveguide is formed of plastic.

7. The mirror assembly of claim 6, wherein a cladding of the waveguide is air surrounding the waveguide.

8. The mirror assembly of claim 6, wherein a cladding of the waveguide is formed by coating the waveguide with a material that has a lower refractive index than a refractive index of the plastic.

9. The mirror assembly of claim 8, wherein the coating is used to secured the waveguide to the exterior mirror housing.

10. The mirror assembly of claim 6, wherein the waveguide is formed as a part of the mirror housing.

11. The mirror assembly of claim 1, wherein the exterior mirror housing comprises a slot which receives the light source and waveguide.

12. The mirror assembly of claim 1, wherein the waveguide includes an outer reflective layer positioned at an end of the waveguide.

13. The mirror assembly of claim 1, wherein the transmitted light is polarized.

14. The mirror assembly of claim 1, wherein the transmitted light is a color chosen to depend on light source usage.

15. A mirror assembly for a vehicle comprising:

a mirror housing having an opening located at a lower portion of the housing;

a mirror secured to the mirror housing;

a light source mounted within the mirror housing; and a waveguide mounted within the mirror housing and extending through the housing from an input end to an output end, wherein the input end is oriented relative to the light source to receive light emanating from the light source and the output end is located within the opening in the mirror housing such that the output end forms both a lower, exterior surface portion of the mirror housing and a front, exterior surface portion of the mirror housing, and wherein light entering the input end of the waveguide from the light source is conducted by internal reflection within the waveguide and exits the mirror housing through the output end of the waveguide;

wherein the waveguide is attached to the mirror housing.

16. The mirror assembly of claim 1, wherein the waveguide has a rectangular cross sectional area perpendicular to a direction of the light.

17. The mirror assembly of claim 1, wherein the waveguide comprises an outer surface that transmits light at a direction dependent on a normal angle to the outer surface.

18. A mirror assembly for a vehicle comprising:

a mirror housing having an opening located at a lower portion of the housing;

a mirror secured to the mirror housing;

a light source mounted within the mirror housing; and a waveguide mounted within the mirror housing and extending through the housing from an input end to an output end, wherein the input end is oriented relative to the light source to receive light emanating from the light source and the output end is located within the opening in the mirror housing such that the output end forms both a lower, exterior surface portion of the mirror housing and a front, exterior surface portion of the mirror housing, and wherein light entering the input end of the waveguide from the light source is conducted by internal reflection within the waveguide and exits the mirror housing through the output end of the waveguide;

wherein the waveguide has a cylindrical cross sectional area perpendicular to a direction of the light.

19. A mirror assembly for a vehicle comprising:

a mirror housing;

a mirror secured to the mirror housing;

a bulb holder positioned inside the mirror housing, the bulb holder having an opening through which light exits the bulb holder;

a light source located within the bulb holder;

a waveguide having a first end located within the opening in the bulb holder and conforming in shape to said opening so that substantially all of the light exiting the bulb holder enters the waveguide, the waveguide further including a second end located near an opening in the mirror housing to transmit the light out of the mirror housing;

wherein light entering the first end of the waveguide is conducted by internal reflection within the waveguide and exits through the opening in the mirror housing via the second end of the waveguide.

20. The mirror assembly of claim 19, wherein the second end of the waveguide fits within the opening in the mirror housing and forms an exterior surface of the mirror housing.

21. The mirror assembly of claim 19, wherein the opening in the mirror housing comprises a slot in the mirror housing and wherein the second end of the waveguide is configured to direct light rearwardly from the mirror housing.

22. The mirror assembly of claim 21, wherein the waveguide is further configured to direct light downwardly from the mirror housing.

23. A mirror assembly for a vehicle comprising:

a mirror housing having an opening located at a lower portion of the housing;

a mirror secured to the mirror housing;

a light source mounted within the mirror housing;

a waveguide mounted within the mirror housing and being arranged within the housing to receive light from the light source and conduct the light to the opening in the housing, wherein the waveguide directs the received light both downwardly and rearwardly from the opening to thereby provide both ground and rearwardly-directed illumination from the mirror housing.

24. The mirror assembly of claim 23, wherein a portion of the waveguide fits within the opening in the mirror housing and forms an exterior surface of the mirror housing.

* * * * *

UNITED STATES PATENT AND TRADEMARK OFFICE
CERTIFICATE OF CORRECTION

PATENT NO. : 6,502,970 B1
DATED : January 7, 2003
INVENTOR(S) : James Burr Anderson and George Robert Hulse It is certified that error appears in the above-identified patent and that said Letters Patent is hereby corrected as shown below:

Title page,
Item [73], Assignee, delete "Mogus" and insert therein -- Mogul --.

Column 5,
Line 8, after "attached to the" delete "assembly" and insert -- housing --.
Line 28, after "used to" delete "secured" and insert therein -- secure --.
Line 32, after "wherein the" delete "exterior".

Column 6,
Line 28, after "bulb holder;", insert -- and --.
Line 32, after "waveguide", (second instance) insert -- being spaced from the light source at its first end and extending externally of the bulb holder, with the waveguide --.
Line 36, delete "entering" and insert therefor -- exiting the light source travels through the bulb holder and enters --.
Line 36, after "waveguide" insert -- and --.
Lines 40-42, delete entire claim and insert the following:
A mirror assembly for a vehicle comprising:
    a mirror housing;

a mirror secured to the mirror housing;

a bulb holder positioned inside the mirror housing, the bulb holder having an opening through which light exits the bulb holder, a light source located within the bulb holder, and a waveguide having a first end located within the opening in the bulb holder and conforming in shape to said opening so that substantially all of the light exiting the bulb holder enters the waveguide, the waveguide further including a second end that fits within an opening in the mirror housing and forms an exterior surface of the mirror housing;

UNITED STATES PATENT AND TRADEMARK OFFICE
CERTIFICATE OF CORRECTION

PATENT NO.    : 6,502,970 B1
DATED         : January 7, 2003
INVENTOR(S)   : James Burr Anderson and George Robert Hulse It is certified that error appears in the above-identified patent and that said Letters Patent is hereby corrected as shown below:

<u>Column 6, (cont.)</u>
    wherein light entering the first end of the waveguide is conducted by internal reflection within the waveguide and exits through the opening in the mirror housing via the second end of the waveguide.

Signed and Sealed this

Fourth Day of January, 2005

JON W. DUDAS
*Director of the United States Patent and Trademark Office*